US007360096B2

(12) United States Patent
Bracewell et al.

(10) Patent No.: US 7,360,096 B2
(45) Date of Patent: Apr. 15, 2008

(54) SECURELY PROCESSING CLIENT CREDENTIALS USED FOR WEB-BASED ACCESS TO RESOURCES

(75) Inventors: Shawn Derek Bracewell, Duvall, WA (US); Richard B. Ward, Redmond, WA (US); Russell Lee Simpson, Jr., Kirkland, WA (US); Karim Michel Batthish, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 10/459,863

(22) Filed: Jun. 12, 2003

(65) Prior Publication Data

US 2004/0098609 A1     May 20, 2004

Related U.S. Application Data

(60) Provisional application No. 60/428,152, filed on Nov. 20, 2002.

(51) Int. Cl.
    *H04L 9/00*    (2006.01)
(52) U.S. Cl. ............................. 713/183; 726/5; 726/10
(58) Field of Classification Search ............... 713/183; 726/5–10
    See application file for complete search history.

(56) References Cited

U.S. PATENT DOCUMENTS

| 4,972,472 | A  | * | 11/1990 | Brown et al. ............... 380/277 |
| 5,168,520 | A  | * | 12/1992 | Weiss ......................... 713/184 |
| 5,237,614 | A  | * | 8/1993  | Weiss ......................... 713/159 |
| 5,657,388 | A  | * | 8/1997  | Weiss ......................... 713/185 |
| 6,834,271 | B1 | * | 12/2004 | Hodgson et al. ............... 705/72 |

* cited by examiner

*Primary Examiner*—Kambiz Zand
*Assistant Examiner*—Jacob Lipman
(74) *Attorney, Agent, or Firm*—Workman Nydegger

(57) ABSTRACT

The present invention provides for securely processing client credentials used for Web-based access to resources. A login page with an interface for entering user credentials is presented at a client and entered user credentials are sent to the server. In response to receiving user credentials, the server generates a unique session identifier for the client. The server also derives a digital signature for the user credentials based on a current key in a rotating key store and the unique session identifier. The server then encrypts the digital signature and the user credentials based on an encryption key derived from the current key and the unique session identifier. When encrypted credentials are received back at the client, keys from the rotating key store are used to attempt to validate the credentials. If user credentials can not be validated, a user is again presented with the login page.

10 Claims, 7 Drawing Sheets

SECURELY PROCESSING CLIENT CREDENTIALS USED FOR WEB-BASED ACCESS TO RESOURCES

CROSS-REFERENCE TO RELATED APPLICATIONS

The present application claims the benefit of U.S. provisional patent application Ser. No. 60/428,152, filed Nov. 20, 2002, and entitled "System And Method For Cookie Based Authentication" which provisional application is incorporated herein by reference in its entirety.

BACKGROUND OF THE INVENTION

1. The Field of the Invention

The present invention relates to computer networks, and more specifically, to securely processing client credentials used for Web-based access to resources.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form both wired and wireless computer networks over which the computer systems can communicate electronically to share data. As a result, many tasks performed at a computer system (e.g., voice communication, accessing electronic mail, electronic conferencing, web browsing) include electronic communication with one or more other computer systems via wired and/or wireless computer networks.

In particular, electronic mail has become an important method for communicating. Electronic mail systems typically include an electronic mail client component and an electronic mail server component. These components are typically software applications that are configured to execute on computer systems (e.g., servers, PCs, laptops, and PDAs). An electronic mail client component and electronic mail server component are typically designed and configured for specific operation with one another. The electronic mail client component and electronic mail server component generally communicate with each other using a proprietary protocol, such as, Remote Procedure Calls ("RPCs"), which allows, for example, an application program at a client computer system to execute a program on a server computer system. For example, an electronic mail client component can send a message to an electronic mail server component with appropriate arguments and the electronic mail sever component returns an electronic mail message.

Some types of electronic mail servers are configured to allow electronic mail access via a "zero-touch" client, such as, for example, a client computer system with a Web browser, rather than a dedicated electronic mail client. In these types of electronic mail servers, the Web browser interacts with the electronic mail server, and any functions required to be performed on the client system are performed through the Web browser. For example, a client computer system can download HyperText Markup Language ("HTML") instructions and scripts (dynamically generated by a technology such as Active Server Pages) that enable a Web browser to appropriately interact with the electronic mail server. Thus, a zero-touch browser-based client allows a user to access their electronic mail and other mail related information (e.g., calendar and shared folders) from any server computer system that is connected to a common network (e.g., the World Wide Web ("WWW")) with the zero-touch browser-based client. Accordingly, protocols, such as, for example, HyperText Transfer Protocol ("HTTP"), used to access other Web-based content on the WWW can also be used to access electronic mail and other mail related information.

However, browser-based accessibility to electronic mail and other mail related information also results in potential security issues, some security issues being related to the caching of user credentials in Web browser memory. In a Web environment, content and requests for content, are generally transported using HTTP. For example, an HTTP request to access content originates from a user at a browser-based client and is then transferred from the browser-based client across a network. The request is then received at a Web server at a server computer system that processes the request to determine if the user of the browser-based client is authorized to access the requested content. If the user is authorized to access the requested content, the Web server will transport the content back to the browser-based client in an HTTP message.

Some versions of HTTP (e.g., HTTP/1.0) are stateless. That is, communication via HTTP (e.g., a request for an electronic mail message) is performed without knowledge of any previous communication by the server (e.g., other previous requests for electronic mail messages). As such, these versions of HTTP do not support the concept of a "session" where a user would "log-in" or "log-out." Other versions of HTTP (e.g., HTTP/1.1) support "keep-alive" messages that are sent between a client and a server to attempt to keep an HTTP connection alive. However, use of keep-alive messages are somewhat unreliable and even when keep-alive messages are used there is no guarantee that an HTTP connection can be kept active. Further, since client requests are frequently funneled through intermediate proxy servers that share keep-alive links among a number of users, there may be no way for a server to determine if a received request was sent by a previously authenticated client. Accordingly, whether HTTP communication is stateless or uses keep-alive message, each request to access content that is transported via HTTP (hereinafter called "an HTTP request") must include appropriate HTTP authentication information.

Accordingly, HTTP authentication information can be included in HTTP requests via a special header called the WWW-Authorization header and having the format: "WWW-Authorization: [Authentication-Type] [Credentials]." The first time a Web browser attempts to access content which requires authentication (e.g., the submission user-entered credentials), a Web server will typically refuse to provide the requested content and instead return an HTTP message with status code 401 Unauthorized. The HTTP response message includes a header of the format: "WWW-Authenticate: [Authentication method] [realm=realm value] [Optional information]".

When received back at the Web browser, the HTTP response message causes the Web browser to present a dialog box requesting credentials, such as, for example, a user name and password. After a user enters credentials, the Web browser retransmits the original HTTP request along with an HTTP WWW-Authorization header that includes the entered credentials. If the Web server accepts the user entered credentials as valid and returns the requested content (e.g., an electronic mail message), the Web browser caches the user entered credentials in browser memory. Thus, in subsequent requests to the same Uniform Resource Locator ("URL") or corresponding derivative relative URL's associated with the same content, the cached credentials are retrieved from browser memory and included in corresponding HTTP WWW-Authorization headers. Accordingly, even though HTTP is stateless, a user is relieved from having to re-enter credentials for each request to the same or corresponding derivative relative URL's.

Unfortunately, Web browsers usually maintain cached credentials in browser memory essentially indefinitely until a Web browser is made to exit (by quitting the Web browser program or re-booting or turning off the computer system or client device). Thus, the credentials of a privileged user who accessed protected content may be cached in browser memory after the user is no longer using the Web browser. If the privileged user then steps away from the computer system, another non-privileged user may come along and use the browser's back-button or history feature to attempt to access the protected content. Since the privileged user's credentials are still cached in browser memory, the Web browser would retrieve the cached credentials and submit them along with the non-privileged user's request to access the protected content. Thus, the non-privileged user may be given access the protected content without having to enter appropriate credentials at the Web browser.

Cached credentials can be especially problematic in locations that have public computers and/or on computer systems that do not allow a Web browser to be closed. One example of such a computer system is an Internet Kiosk. Internet Kiosks are often located in public places, such as, for example, libraries, Internet cafes, and conference centers, to provide the public with access to the Internet. Internet Kiosks are designed to allow anyone who walks up to the kiosk to be able to quickly access the Internet without first having to find and launch a Web browser. Thus, many Internet Kiosks are configured such that a Web browser is always active and can not be closed.

While this provides efficient access to the Internet, it also potentially results in cached credentials remaining in browser memory essentially indefinitely. For example, when a privileged user enters credentials (e.g., to access protected content) at in Internet Kiosk, the privileged user's credentials are cached in browser memory. Since the Web browser can not be closed, there is essentially no way to remove the cached credentials without removing power to the public Kiosk. Thus, even if the privileged user has the know how to clear cached credentials (e.g., by closing the Web browser), the privileged user may be prevented from doing so.

Use of cached credentials to access protected content is of particular concern for browser-based electronic mail applications. For example, a non-privileged user may be able to page back to gain access to a privileged user's electronic mail messages, which could contain private data. In addition to accessing the privileged user's electronic mail, cached credentials may also enable the non-privileged user to impersonate the privileged user. For example, the non-privileged may be able to send electronic mail messages from an account associated with a privileged user.

One possible solution to this problem is to force users to re-authenticate each time content is requested. However, this would require users to manually re-enter authentication information for each HTTP request to access content. As a typical interaction with a Web site can consist of tens or even hundreds of HTTP requests, this would result in a user having to re-enter credentials tens or hundreds of times. Thus, re-entering credentials for each HTTP request would significantly increase the amount of time and data entry needed to access content. This solution is too cumbersome for most users, who would prefer to enter their credentials only once per session. Therefore systems, methods, computer program products for securely processing client credentials used to access Web-based resources would be advantageous.

BRIEF SUMMARY OF THE INVENTION

The foregoing problems with the prior state of the art are overcome by the principles of the present invention, which are directed towards methods, systems, computer program products, and data structures for securely processing client credentials used for Web-based access to resources. A client computer system (hereinafter referred to as the "client") and a server computer system (hereinafter referred to as the "server") are connected to a common network, such as, for example, the Internet. The server is configured to allow Web-based access to resources, such as, for example, electronic mail messages and associated mail data. The client is configured with a browser that can request access to Web-based resources and present Web-based resources to a user at the client.

The client sends a first request to access a resource at the server. For example, the client can send a request to access an electronic mail message stored at the server. The server receives the first request and since the client is unauthenticated, the server redirects the client to a login page in response to receiving the first request. Redirecting the client can include the server sending the client a response that includes a redirection indicator (e.g., a HyperText Transfer Protocol ("HTTP") Message with a status code 302 Moved Temporarily) along with a Uniform Resource Identifier ("URI") to the login page. The login page can be an Active Server Pages ("ASP") page that provides an interface for a user at the client to enter user credentials. The client accesses the login page and utilizes the login page to submit user credentials to the server. A client can submit credentials, for example, using Secure Sockets Layer ("SSL") to secure an HTTP post.

The server receives the submitted credentials. The server sends encrypted information that represents the user credentials and a time-dependent digital signature. It may be that the server sends encrypted information after delegating authentication of the submitted credentials to an authority trusted to perform authentication. The server generates the encrypted data using a key from a rotating key store. Each key in the rotating key store is automatically expired after a specified time interval (e.g., ten minutes). After the specified time interval, the server can rotate a new key into the rotating key store and rotate an expired key out of the rotating key store. The number of keys maintained in a rotating key store and the specified time interval can be configured by an administrator.

When user credentials are received, the server associates the user credentials with a unique identifier (e.g., a Globally Unique Identifier ("GUID")). The server derives a signature key, which can be used to digitally sign data, by hashing (e.g., using the SHA-1 or MD-5 hashing algorithm) a combination of the most current key in the rotating key store, the unique identifier, and a first constant string. The server then uses the signature key to derive a digital signature (e.g., a Hashed Message Authentication Code ("HMAC")) from a combination of the unique identifier and the user credentials.

The server also derives an encryption key, which can be used to encrypt data, by hashing a combination of the most current key in the rotating key store, the unique identifier, and a second constant string. The server then uses the encryption key to encrypt a combination of the digital signature and the user credentials into encrypted information. The server sends the unique identifier and the encrypted information to the client. The client receives the unique identifier and the encrypted information and stores the unique identifier and the encrypted information (e.g., in corresponding cookies).

The client sends a second request, including the unique identifier and the encrypted information, to access the resource at the server. The server receives the second request and attempts to validate the user credentials using the most current key in the rotating key store. The server derives a decryption key, which can be used to decrypt data, by hashing a combination of the most current key in the rotating key store, the unique identifier, and the second constant string. The server uses the decryption key to decrypt the encrypted information, thereby revealing the digital signature and the user-credentials. The server derives a validation key, which can be used to authenticate data, by hashing a combination of the most current key in the rotating key store, the unique identifier, and the first constant string. The server uses the validation signature key to derive a validation digital signature from a combination of the unique identifier and the user credentials.

The server compares the validation digital signature to the digital signature. When the validation digital signature and the digital signature match, the user credentials are validated. On the other hand, when the validation digital signature and the digital signature do not match, the credentials are not validated. When user credentials are not validated using the most current key in the rotating key store, the next most current key in the rotating key store is used to attempt to validate the user-credentials (e.g., by using the next most current key to generate a decryption key and validation digital signature). The server can attempt to validate the user credentials using each key in the rotating key store. Validated user credentials are forwarded to a module (e.g., an electronic mail server) that controls access to the requested resource (e.g., an electronic mail message).

When user credentials are validated with a key from the rotating key store that is not the most current key, the server determines that refreshed encrypted information is to be derived. The server uses the most current key in the rotating key store to derive the refreshed encrypted information (e.g., by deriving a refreshed digital signature and refreshed encryption key from the most current key). When validated user credentials are appropriate, the requested resource and, when appropriate, also refreshed encrypted information is returned to the client. The client receives the resource and any refreshed encrypted information. The client stores any refreshed encrypted information, overwriting previous encrypted information corresponding to the unique identifier. When user credentials can not be validated using any rotating keys in the rotating key store, the client is re-directed to the login page where new user credentials can be entered.

In some embodiments, a login page includes an interface for selecting communication properties (e.g., support for gzip compression, client computer system is a private or non-trusted client, client is an advanced client that would prefer simplified content) that can alter how HTTP messages are processed. Communication properties are selected at the login page and sent to a communication filter to indicate to the communication filter how HTTP communication with the client is to be processed. The selected communication properties are received at the server.

The server interrogates the client to determine if the selected communication properties are supported by the client as well as to identify other relevant communication properties. The server configures the communication filter to process HTTP communication with the client in accordance with any selected communication properties and identified other relevant communication properties supported by the client. Based on a client being in a non-secure location, the server may utilize a different rotating key store that has a shorter rotation interval and maintains a reduced number of keys.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
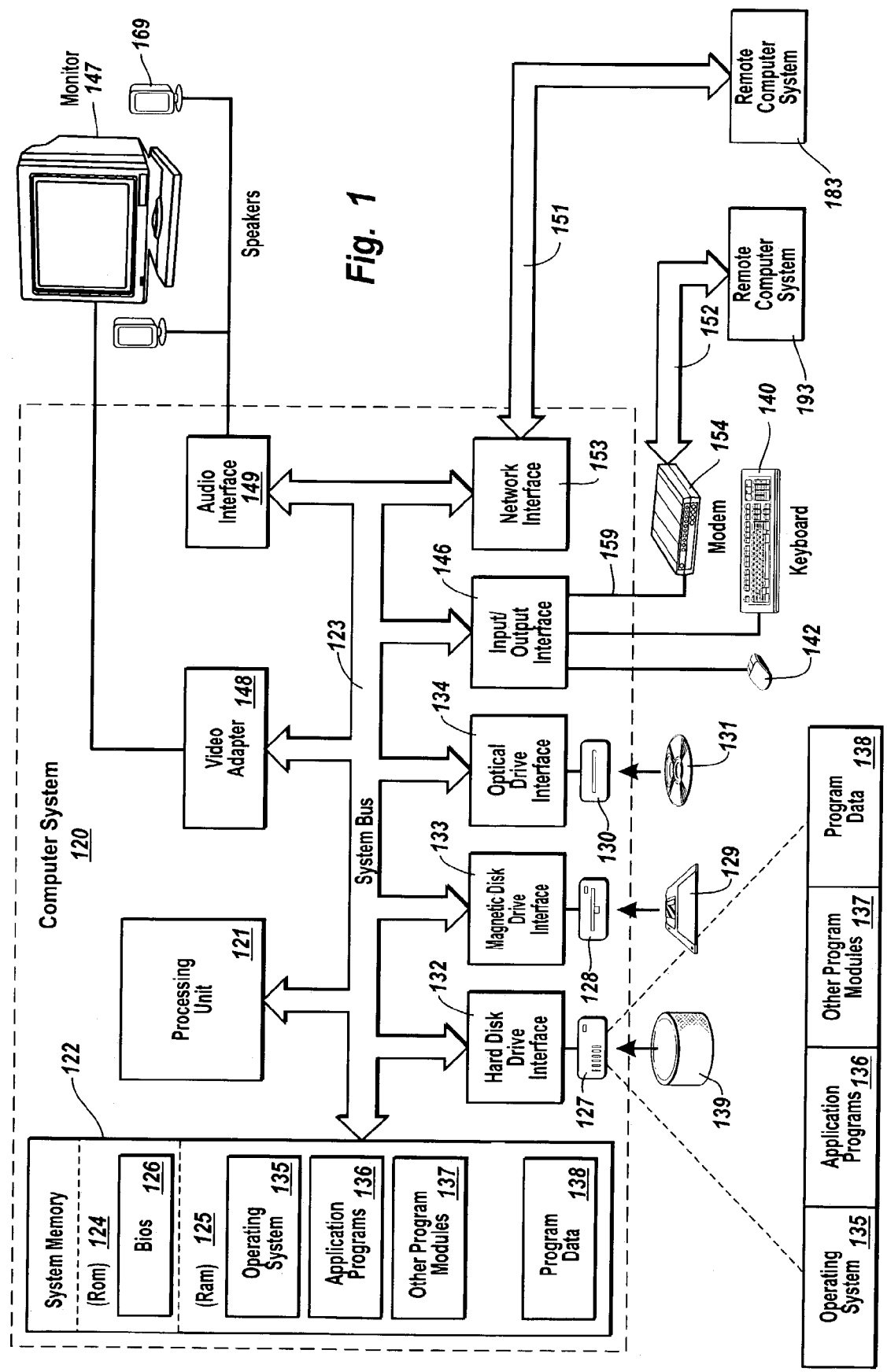
FIG. 1 illustrates a suitable operating environment for the principles of the present invention.

The principles of the present invention provide for securely processing client credentials used for Web-based access to resources. A server maintains at least one rotating key store of one or more keys. Each key in a rotating key store is automatically expired after a specified time interval (e.g., ten minutes). After the specified time interval, the server rotates a new key into the rotating key store and rotates an expired key out of the rotating key store. The number of keys maintained in the rotating key store and the specified time interval can be configured by an administrator (e.g., maintain three keys and rotate keys every five minutes). The server secures user credentials by generating digital signatures for user credentials and encrypting user credentials based on keys in the rotating key store.

A login page with an interface for entering user credentials is presented at a client. User credentials entered at the client are sent to the server. In response to receiving user credentials, the server generates a unique session identifier for the client. The server derives a digital signature for the user credentials based on the most current key in a rotating key store and the unique session identifier. The server then encrypts the digital signature and the user credentials based on an encryption key derived from most current key in a rotating key store and the unique session identifier. When encrypted credentials are received back at the client, keys from the rotating key store are used to attempt to validate the credentials. If the key from the rotating key store originally used to encrypt user credentials has rotated out of the rotating key store, the client is re-directed to the login page to enter new credentials.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, an example system for implementing the invention includes a general-purpose computing device in the form of computer system 120, including a processing unit 121, a system memory 122, and a system bus 123 that couples various system components including the system memory 122 to the processing unit 121. Processing unit 121 can execute computer-executable instructions designed to implement features of computer system 120, including features of the present invention. The system bus 123 may be any of several types of bus structures including a memory bus or memory controller, a peripheral bus, and a local bus using any of a variety of bus architectures. The system memory includes read only memory ("ROM") 124 and random access memory ("RAM") 125. A basic input/output system ("BIOS") 126, containing the basic routines that help transfer information between elements within computer system 120, such as during start-up, may be stored in ROM 124.

The computer system 120 may also include magnetic hard disk drive 127 for reading from and writing to magnetic hard disk 139, magnetic disk drive 128 for reading from or writing to removable magnetic disk 129, and optical disk drive 130 for reading from or writing to removable optical disk 131, such as, or example, a CD-ROM or other optical media. The magnetic hard disk drive 127, magnetic disk drive 128, and optical disk drive 130 are connected to the system bus 123 by hard disk drive interface 132, magnetic disk drive-interface 133, and optical drive interface 134, respectively. The drives and their associated computer-readable media provide nonvolatile storage of computer-executable instructions, data structures, program modules, and other data for the computer system 120. Although the example environment described herein employs magnetic hard disk 139, removable magnetic disk 129 and removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 139, magnetic disk 129, optical disk 131, ROM 124 or RAM 125, including an operating system 135, one or more application programs 136, other program modules 137, and program data 138. A user may enter commands and information into computer system 120 through keyboard 140, pointing device 142, or other input devices (not shown), such as, for example, a microphone, joy stick, game pad, scanner, or the like. These and other input devices can be connected to the processing unit 121 through input/output interface 146 coupled to system bus 123. Input/output interface 146 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 147 or other display device is also connected to system bus 123 via video adapter 148. Speakers 169 or other audio output device is also connected to system bus 123 via audio interface 149. Other peripheral output devices (not shown), such as, for example, printers, can also be connected to computer system 120. Computer system 120 is connectable to networks, such as, for example, an office-wide or enterprise-wide computer network, a home network, an intranet, and/or the Internet. Computer system 120 can exchange data with external sources, such as, for example, remote computer systems, remote applications, and/or remote databases over such networks.

Computer system 120 includes network interface 153, through which computer system 120 receives data from external sources and/or transmits data to external sources. As depicted in FIG. 1, network interface 153 facilitates the exchange of data with remote computer system 183 via link 151. Network interface 153 can logically represent one or more software and/or hardware modules, such as, for example, a network interface card and corresponding Network Driver Interface Specification ("NDIS") stack. Link 151 represents a portion of a network (e.g., an Ethernet segment), and remote computer system 183 represents a node of the network. For example, remote computer system 183 can be server computer system that provides computer system 120 with Web-based access to resources (e.g., electronic mail messages). On the other hand, remote computer system 183 can be a client computer system that uses Web-based access to access resources from computer system 120.

Likewise, computer system 120 includes input/output interface 146, through which computer system 120 receives data from external sources and/or transmits data to external sources. Input/output interface 146 is coupled to modem 154 (e.g., a standard modem, a cable modem, or digital subscriber line ("DSL") modem) via link 159, through which computer system 120 receives data from and/or transmits data to external sources. As depicted in FIG. 1, input/output interface 146 and modem 154 facilitate the exchange of data with remote computer system 193 via link 152. Link 152 represents a portion of a network and remote computer system 193 represents a node of the network. For example, remote computer system 193 can be server computer system that provides computer system 120 with Web-based access to resources (e.g., electronic mail messages). On the other hand, remote computer system 193 can be a client computer system that uses Web-based access to access resources from computer system 120.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

Modules of the present invention, as well as associated program data, may be stored and accessed from any of the computer-readable media associated with computer system 120. For example, portions of such modules and portions of associated program data can be included in operating system 135, application programs 136, program modules 137 and/or program data 138, for storage in system memory 122. When a mass storage device, such as, for example, magnetic hard disk 139, is coupled to computer system 120, such modules and associated program data may also be stored in the mass storage device. In a networked environment, program modules depicted relative to computer system 120, or portions thereof, can be stored in remote memory storage devices, such as, system memory and/or mass storage devices associated with remote computer system 183 and/or remote computer system 193. Execution of such modules may be performed in a distributed environment as previously described.

Figure 2A:
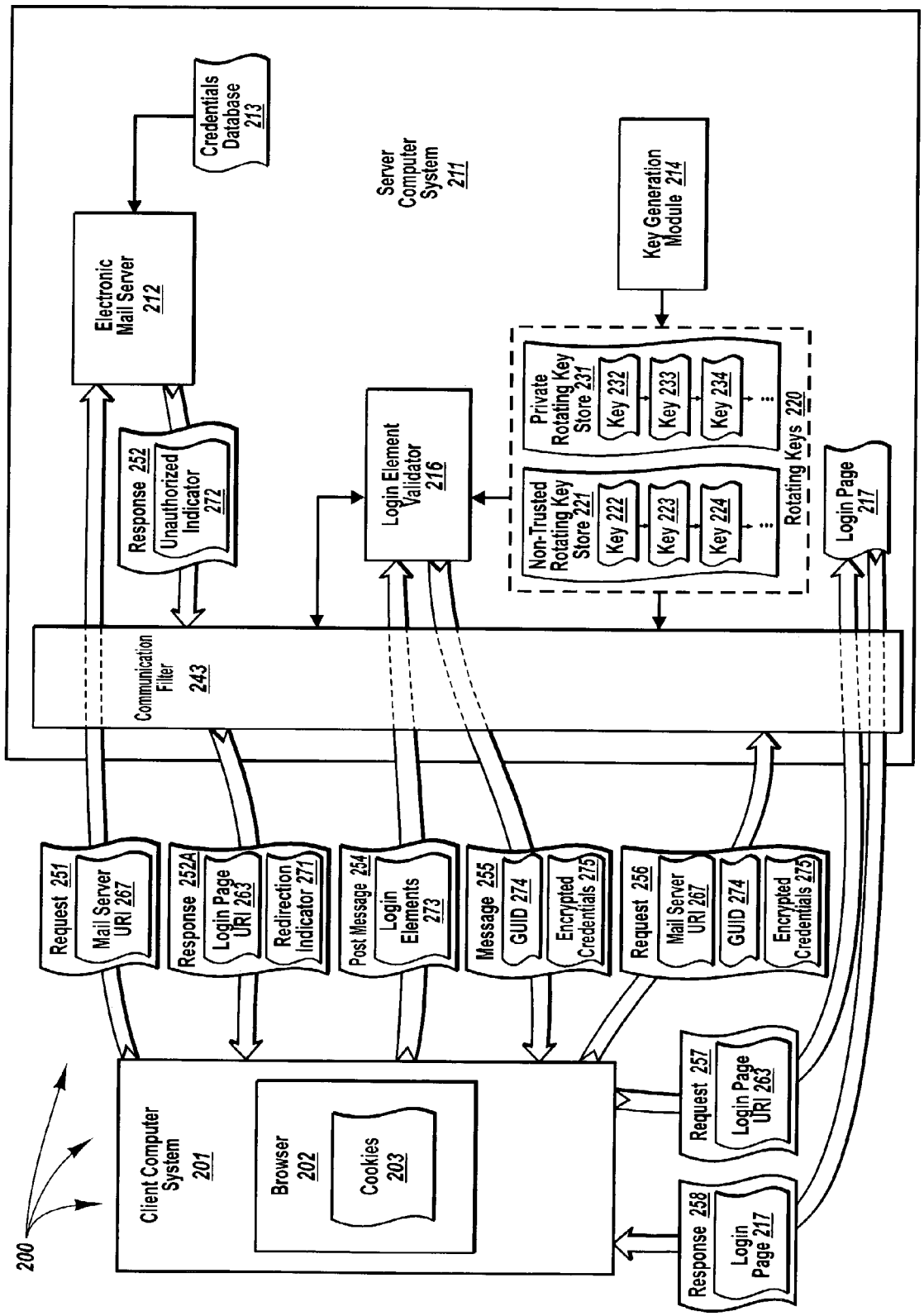
FIG. 2A illustrates an example of a network architecture that facilitates securing client-side credentials when a client requests access to a resource at a server in accordance with the present invention.

FIG. 2 illustrates an example of network architecture 200 that facilitates securing client-side credentials when a client requests access to a resource at a server. Client computer system 201 and server computer system 211 can be connected to a common network, such as, for example, a Local Area Network ("LAN"), Wide Area Network ("WAN"), or even the Internet. Client computer system 201 includes browser 202, that can be used to request Web-based access to resources and present received resources at client computer system 201. Cookies 203 can include one or more cookies that store portions of data previously received from server computer systems. Data in cookies 203 can be sent to a corresponding server computer system to indicate personalized information or preferences to the server computer system and/or to relieve a user from having to manually enter a portion of stored information.

Server computer system 211 includes electronic mail server 212, which provides access to electronic mail resources, such as, for example, electronic mail messages, address book information, and calendaring information. To become authorized to access electronic mail resources, a user may be required to supply credentials to electronic mail server 212 to authenticate with electronic mail server 212. Electronic mail server 212 can compare received credentials to authorized credentials in credentials database 213 to determine if a request to access electronic mail resources is to be granted. When a user is authorized, electronic mail server 212 can return requested electronic mail resources to a requesting client computer system. When a user is not authorized, electronic mail server 212 can return an unauthorized message (e.g., a HyperText Transfer Protocol ("HTTP") message with status code 401 Unauthorized) to a requesting client computer system.

Server computer system 211 also includes key generation module 214. Key generation module 214 can generate and rotate new keys into rotating keys 220 and can rotate expired keys out of rotating keys 220. Key generation module 214 can be configured to maintain one or more rotating key stores. For example in network architecture 200, key generation module 214 maintains non-trusted rotating key store 221 and private rotating key store 231.

The specified time interval when keys are rotated is configurable. That is, key generation module 214 can be configured to rotate newly generated keys into and remove expired keys from a rotating key store at specified intervals. For example, key generation module 214 may insert a new key into and remove an expired key from private rotating key store 231 every 10 minutes. The number of keys maintained in a rotating key store is also configurable. That is, key generation module 214 can also be configured to maintain a specified number of keys in a rotating key store. For example, key generation module 214 can be configured to maintain 3 keys in non-trusted rotating key store 221.

The number of maintained keys and specified intervals can differ between rotating key stores. For example, key generation module 214 can maintain 3 keys with a specified rotation interval of five minutes in non-trusted key store 221 and four keys with a specified rotation interval of one hour in private key store 231. Depending on the properties associated with a client computer system, different key stores can be utilized to implement the principles of the present invention. The arrows depicted below keys in the rotating key stores indicate that the keys rotate down when a new key is added, until expired keys eventually rotate out of the rotating key store. For example, when a new key is added to private rotating key store 231, key 232 will rotate into the position of key 233.

Server computer system 211 also includes login page 217. Login page 217 can be a Web page (e.g., an Active Server Pages ("ASP") page) that provides an interface for submitting user credentials and selecting communication properties associated with a client computer system. In response to a client computer system accessing a Uniform Resource Identifier ("URI") corresponding to login page 217, server computer system 211 can send login page 217 to the client compute system. A client-side browser can present login page 217 at a client computer system. User credentials and communication property selections submitted at login page 217 can be sent to server computer system 211.

Server computer system also includes communication filter 243. Communication filter 243 can intercept HTTP communication, such as, for example, requests, responses, and messages, that are transferred into and out of server computer system 211. Communication filter 243 can refer to client state information included in encrypted cookies to determine if HTTP communication between server computer system 211 and a client computer system should be altered (e.g., by modifying HTTP headers). Communication filter 243 can also implement cryptographic algorithms (utilizing keys from a rotating key store) to decrypt and validate user credentials.

Server computer system 211 also includes login element validator 216. Login element validator 216 can receive submitted user credentials entered at login page 217 and implement cryptographic algorithms (utilizing keys from a rotating key store) to digitally sign and encrypt submitted user credentials. Login element validator 216 can also generate unique session identifiers (e.g., Globally Unique Identifiers ("GUIDs")) for client computer systems that request Web-based access to resources of server computer system 211. Login element validator 216 can send unique session identifiers and encrypted information, including user credentials and time-dependent digital signatures, to client computer systems. For example, login element validator 216 can send unique session identifiers and encrypted user credentials to client computer system 201 for storage in cookies 203.

Figure 3:
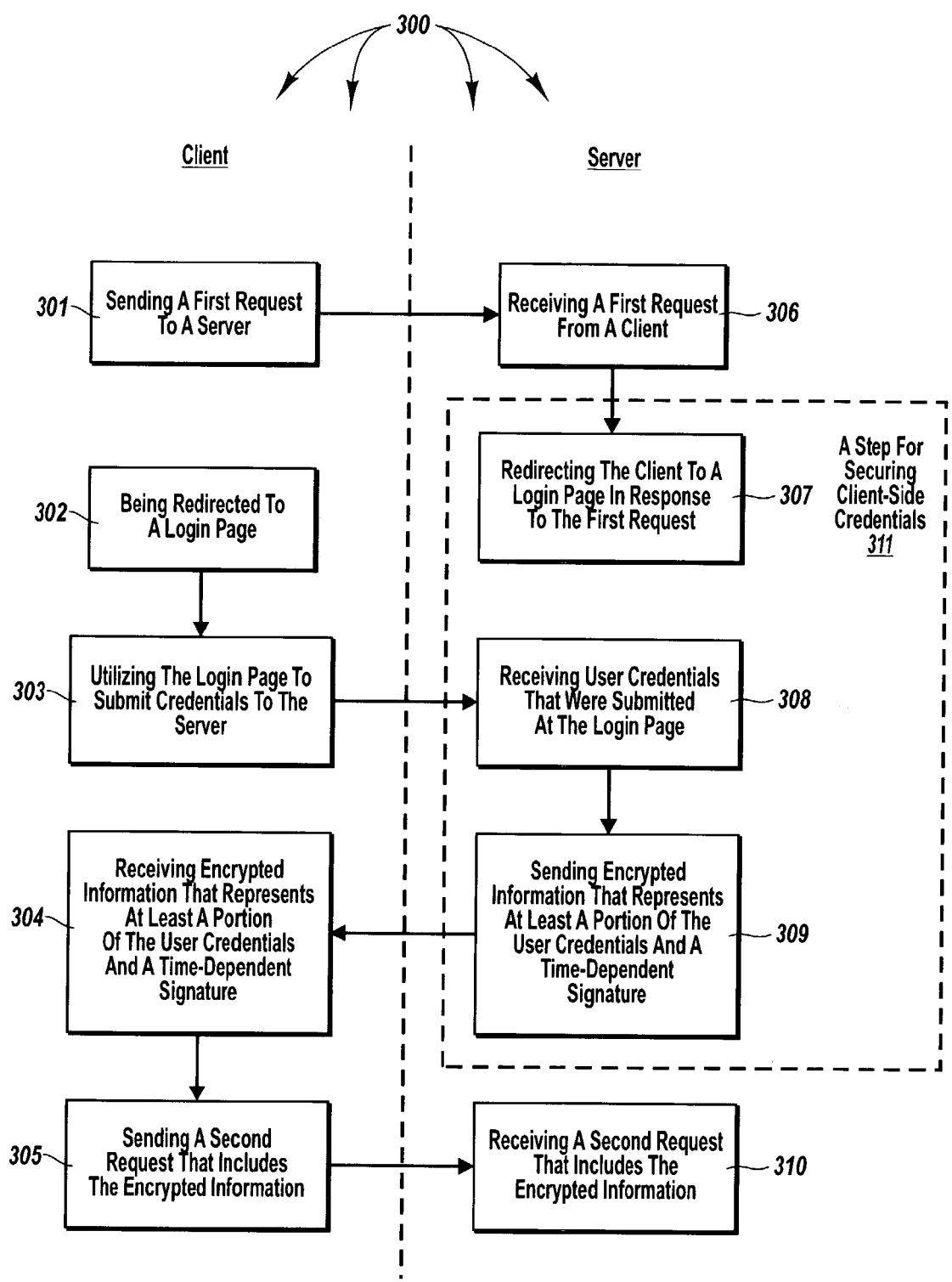
FIG. 3 illustrates an example flowchart of a method for securing client-side credentials when a client requests access to a resource at a server in accordance with the present invention.

FIG. 3 illustrates an example flowchart of a method 300 for securing client-side credentials when a client requests access to a resource at a server. The method 300 will be described with respect to the client computer system and server computer system depicted in FIG. 2A. Method 300 includes an act of sending a first request to a server (act 301). Act 301 can include a client computer system sending a first request for Web-based access to a resource (e.g., an electronic mail message) at the server.

For example, client computer system 201 can send request 251, which includes mail server URI 267, to server computer system 211. Mail server URI 267 can be a URI that corresponds to electronic mail server 212. That is, users who desire to access electronic mail resources maintained by electronic mail server can attempt Web-based access to the electronic mail resources by accessing mail server URI 267. Accordingly, it may be that a user at client computer system 201 enters commands into browser 202 to cause client computer system 201 to send request 251.

Method 300 includes an act of receiving a first request from a client (act 306). Act 306 can include a server computer system receiving a first request for Web-based access to a resource (e.g., the electronic mail message) at the server. For example, server computer system 211 can receive request 251, which includes mail server URI 267, from client computer system 201. As indicated by the dashed line through communication filter 243, communication filter 243 can be configured to allow request 251 to pass without altering request 251. Accordingly, request 251 can be forwarded to electronic mail server 212 without modification.

Method 300 includes a functional result-oriented step for securing client-side credentials (step 311). Step 311 can include any corresponding acts for securing client-side credentials. However, in the illustrated example of FIG. 3, step 311 includes a corresponding act of redirecting the client to a login page in response to the first request (act 307). Act 307 can include the server computer system redirecting the client computer system to a login page in response to the first request.

In response to request 251, electronic mail server 212 can send response 252, which includes unauthorized indicator 272. Response 252 can be an HTTP message with status code 401 Unauthorized returned as a result of request 251 not including user credentials. Communication filter 243 can be configured to intercept messages that include unauthorized indicators. Accordingly, communication filter 243 can intercept response 252.

Communication filter 243 can modify the contents of response 252 (e.g., by changing HTTP headers) to cause client computer system 201 to be redirected to a login page that provides an interface for entering user credentials. For example, communication filter 243 can remove unauthorized indicator 272 from response 252 and insert login page URI 263 and redirection indicator 271 into response 252, resulting in response 252A. Response 252A can be an HTTP message with status code 302 Found. Login page URI 263 can be a URI used to access login page 217. Accordingly, response 252A can indicate to client computer system 201 that the requested resource (e.g., the electronic mail message) is instead access at login page URI 263.

Method 300 includes an act of being redirected to a login page (act 302). Act 302 can include a client computer system being redirected to a login page that provides an interface for accepting user credentials. For example, client computer system 201 can be redirected to login page 217. In response to receiving response 252A, client computer system 201 can send request 257, which includes login page URI 263, to server computer system 211. In response to request 257, server computer system 211 can send response 258, which includes login page 217, to client computer system 201. A login page can be a Web page, such as, for example, an Active Server Pages ("ASP") page.

Figure 6:
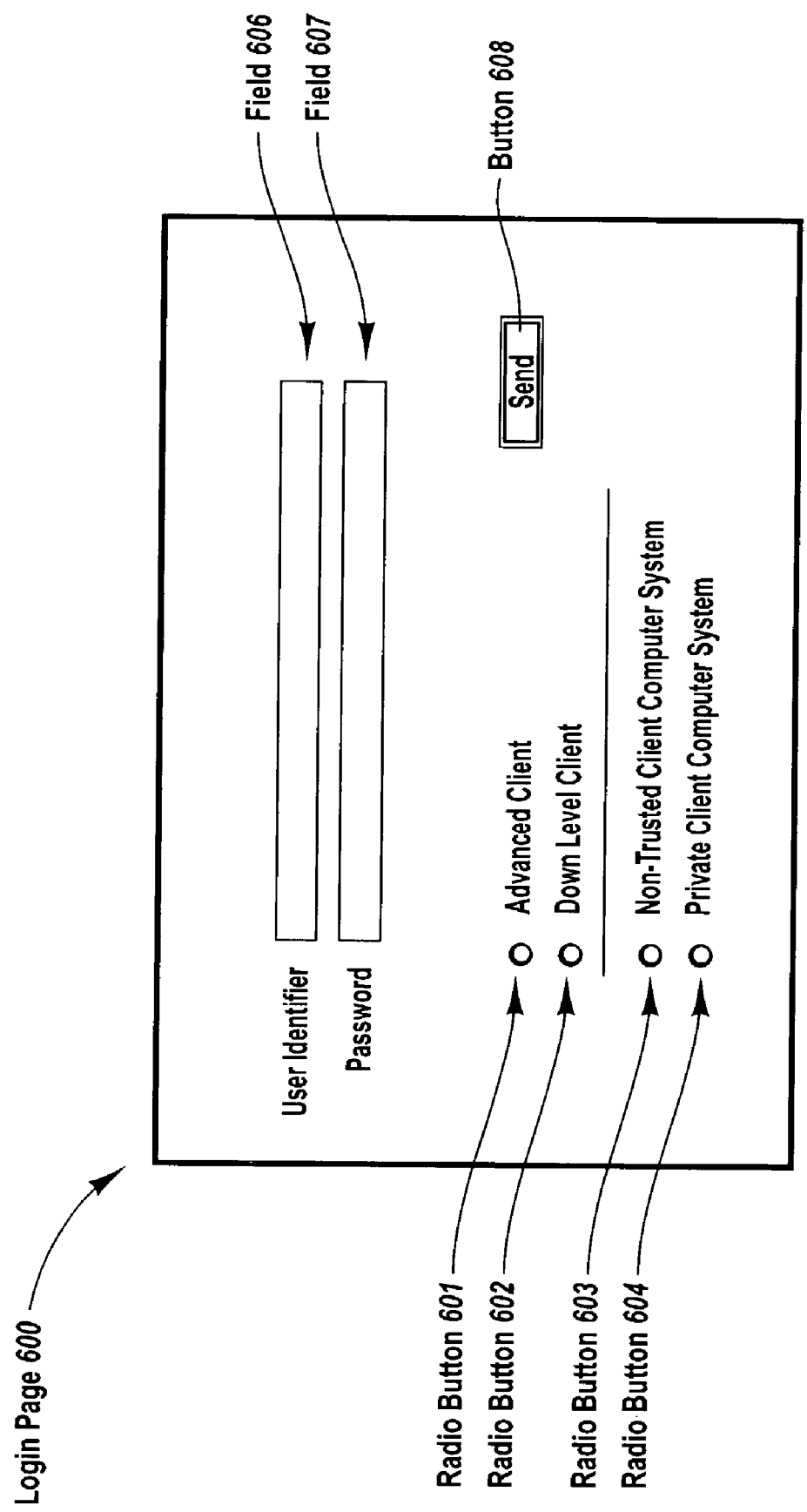
FIG. 6 illustrates an example login page than can accept credentials and communication property selections in accordance with the principles of the present invention.

Browser 202 can present login page 217 at client computer system 201. Moving from FIG. 3 and referring now to FIG. 6, FIG. 6 illustrates an example login page 600 than can accept user credentials and communication property selections in accordance with the principles of the present invention. Login page 217 can be similar to login page 600. Login page 600 includes field 606 that can accept a user identifier and field 607 that can accept a corresponding password.

Radio button 601 can be used to accept a communication property selection indicating that a client-side browser is an "Advanced Client". Radio button 602 can be used to accept a communication property selection indicating that a client-side browser is a "Down Level Client". An Advanced Client may include the functionality to perform more advanced processing, such as, for example, running scripts or presenting multi-media output. On the other hand, a Down Level Client may not include the functionality to perform the advanced processing. Accordingly, the richness of content returned from a server can be appropriately adjusted depending on the capabilities of a client-side browser. When an Advanced Client is connected to a server over a reduced bandwidth and/or high latency connection (e.g., a dial-up connection), a selection of Down Level Client can reduce the amount of content returned from the server.

Radio button 603 can be used to accept a communication property selection indicating that a client-side browser is at a "Non-Trusted Client Computer System". Radio button 604 can be used to accept a communication property selection indicating that a client-side browser is at a "Private Client Computer System". A Private Client Computer System may a home or corporate client computer system that has limited (or even no) public access. A "Non-Trusted Client Computer System" may be a client computer system that has increased public access, such as, for example, an Internet kiosk in a hotel or airport. Accordingly, the security associated with content returned from a server can be appropriately adjusted depending on the trustworthiness of a client computer system. Button 608 can be selected to send entered user-credentials and selected communication properties to a server computer system.

Figure 5:
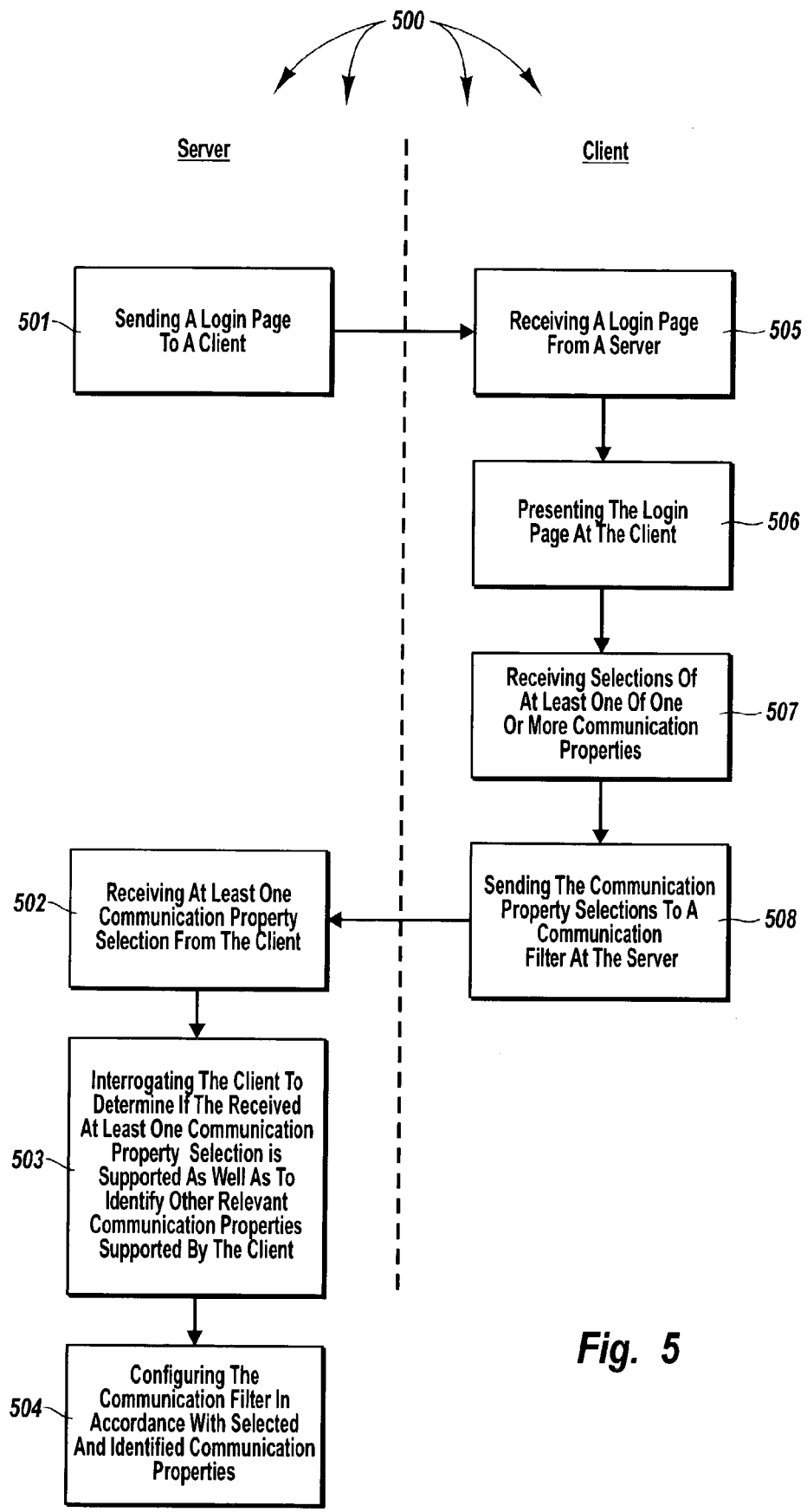
FIG. 5 illustrates an example flowchart of a method for determining communication properties associated with a client in accordance with the principles of the present invention.

Moving from FIG. 6 and referring now to FIG. 5, FIG. 5 illustrates an example flowchart of a method 500 for determining communication properties associated with a client in accordance with the principles of the present invention. The method 500 will be described with respect to the client computer system and server computer system depicted in network architecture 200. Method 500 includes an act of sending a login page to a client (act 501). Act 501 can include a server computer system sending a login page that includes an interface for selecting one or more communication properties that may alter how HTTP messages are to be processed. For example, server computer system 211 can send login page 600 (or a similar login page) to client computer system 201.

Method 500 includes an act of receiving a login page from a server (act 505). Act 505 can include a client computer system receiving a login page that includes an interface for selecting one or more communication properties that may alter how the server processes HTTP messages. For example, client computer system 201 can receive login page 600 (or a similar login page). Method 500 includes an act of presenting the login page at the client (act 506). Act 506 can include a browser at a client computer system presenting the login page at the client computer system. For example, browser 202 can present login page 600 (a similar login page) at client computer system 201.

Method 500 includes an act of receiving selections of at least one of one or more communication properties (act 507). Act 507 can include a client computer system receiving selections of at least one of one or more communication properties at the login page. For example, a user at client computer system 201 can manipulate an input device (e.g., a keyboard and/or mouse) to input communication property selections into login page 600. Login page 600 can receive user-entered selections. For example, login page 600 can receive user-entered selections of either radio button 601 or radio button 602 and user-entered selections of either radio button 603 or radio button 604 (potentially along with receiving user-entered credentials in fields 606 and 607).

Method 500 includes an act of sending the communication property selections to a communication filter at the server (act 508). Act 508 can include a client computer system sending the communication property selections to a communication filter at the server computer system. For example, client computer system 201 can send communication property selections (e.g., along with user-entered credentials) to server computer system 211. Method 500 includes an act of receiving at least one communication property selection from the client (act 502). Act 502 can include the server computer system receiving selections of at least one of the one or more selectable communication property selectable from the login page. For example, communication filter 243 can receive one or more communication property selections (e.g., selected at login page 600) from client computer system 201.

Method 500 includes an act of interrogating the client to determine if the received at least one communication property selections are supported as well as to identify other relevant communication properties supported by the client (act 503). Act 503 can include a server computer system interrogating a client computer system to determine if received communication property selections are supported and to identify other relevant communication properties supported by the client. For example, a server computer system can determine client computer system capabilities using a User-Agent HTTP header and prior knowledge of the client computer system. Additional capabilities of a client computer system can be determined through a login page and from scripts (e.g., JavaScript scripts) that run inside the login page at the client computer system.

Alternately, interrogating a client computer system can include sending requests to the client computer system that cause the client computer system to reveal configuration information to a server computer system. For example, server computer system 211 can send requests to client computer system 201 requesting the configuration of browser 202. In response, browser 202 can indicate configuration information, such as, for example, a version number and whether browser 202 supports HTTP compression, such as, gzip compression. Based on a version number, server computer system 211 can determine whether a selection of "Advanced Client" at login page 600 was appropriate. For example, server computer system may be able to determine that the version of browser of 202 does not support scripts. Thus, even if "Advanced Client" was selected, server computer system may provide simplified content to client computer system 201.

Simplifying content can include reducing the amount of content that is delivered to a client computer system. For example, in response to down level client request for help information, a server computer system may return reduced (less verbose) help information. On the other hand, in response to an advanced client request for help information, a server computer system may return increased help information, for example, include searching scripts and other advanced functionality. A server computer system can also vary delivered content based on the trustworthiness of a client computer system. For example, a server computer system may provide help information on how to access sensitive corporate data to a private client computer system but may not provide the same information to a non-trusted client computer system.

It may be that server computer system 211 tests browser 202 to verify that advertised features are appropriately supported. For example, when browser 202 indicates support for gzip compression, server computer system 211 can send gzip-compressed content to client computer system 201 to determine if browser 202 processes the gzip compress content appropriately. It may be that client computer system 201 configures an appropriate request header indicating support for gzip compression. Client computer system 201 can include the appropriate request header in a client request that is sent to and received at server computer system 211. In response, server computer system 211 can interrogate client computer system 201 to determine if client computer system 201 appropriately caches gzip-compressed content and processes gzip-compressed content in manner that does not detrimentally affect a Web-based application's security and integrity.

Method 500 includes an act of configuring the communication filter in accordance with selected and identified communication properties (act 504). Act 504 can include a server computer system configuring the communication filter to process HTTP communication with the client in accordance with any selected communication properties and identified other relevant properties supported by the client. For example, server computer system 211 can configure communication filter 243 to process HTTP communication with client computer system 201 in accordance with communication property selections (e.g., Advanced Client and Non-Trusted Client computer system) and identified other relevant communication properties (e.g., HTTP compression support) of browser 202.

When an HTTP message is to be sent from server computer system 211 to client computer system 201, communication filter 243 can alter the HTTP message headers and the content of the HTTP message to cause the content to conform to the communication properties for client computer system 201. For example, if electronic mail server 212 sends a message with non-compressed electronic mail information to client computer system 201, communication filter 243 can intercept the message, gzip compress the content, and alter the message headers to indicate that the electronic mail information is gzip compressed. Alternately, other modules of server computer system, such as, for example, modules of an Internet Information Server ("IIS") can implement gzip compression. Accordingly, content can be presented at a client computer system in a manner that best utilizes the capabilities of the client computer system and according to the desires of a user.

When server computer system 211 receives a selection indicating that a client-side browser is at a "Private Client Computer System", a private rotating key store, such as, for example, private key store 231 can be utilized to secure user credentials. On the other hand, when server computer system 211 receives a selection indicating that a client-side browser is at a "Non-Trusted Client Computer System", a non-trusted rotating key store, such as, non-trusted key store 221 can be utilized to secure user credentials.

Referring now back to FIG. 3, method 300 includes an act of utilizing the login page to submit credentials to the server (act 303). Act 303 can include the client computer system utilizing the login page to submit credentials to the server computer system. For example, client computer system 201 can utilize login page 217 to submit credentials (potentially along with communication property selections) to server computer system 211. User credentials and communication property selections can be included as login elements in a post message that is submitted to a login element format validator. For example, client computer system 201 can send post message 254, which includes login elements 273, to server computer system.

Method 300 includes an act of receiving user credentials that were submitted at the login page (act 308). Act 308 can include a server computer system receiving user credentials that were submitted at the login page. For example, server computer system 211 can receive user credentials (potentially along with communication property selections) from client computer system 201. Credentials and communication property selections can be received as login elements in a post message. For example, server computer system 211 can receive post message 254, which includes login elements 273, from client computer system 201. As indicated by the dashed line through communication filter 243, communication filter 243 can be configured to allow post message 254 to pass without altering post message 254. Accordingly, post message 254 can be forwarded to login element validator 216 without modification. When appropriate, a mutually authenticated connection, for example, using Transport Layer Security ("TLS") or Secure Sockets Layer ("SSL"), can be established between a client computer system and server computer system to reduce the likelihood or malicious processes or users "sniffing" packets and to reduce the likelihood of middle-man attacks.

Login element validator 216 can also generate a unique identifier, such as, for example, a Globally Unique Identifier ("GUID"), for client computer system 201. Login element validator 216 can use digital signature and encryption algorithms to secure received user credentials (e.g., included in login elements 273). For example, login element validator 216 can generate a digital signature used to subsequently validate received user credentials. Login element validator 216 can derive a signature key, which can be used to digitally sign data, by hashing (e.g., using the SHA1 or MD-5 hashing algorithms) a combination of a most current key in a rotating key store, the generated unique identifier, and a first constant string. In some embodiments, a digital signature is represented as a Hashed Message Authentication Code. Accordingly, a signature key can be derived according to Formula 1:

$$K_{SIG} = \text{SHA-1}(K_{MOST\ CURRENT\ ROTATING}, \text{GUID}, \text{HMACKeyString})$$

FORMULA 1

In Formula 1, $K_{MOST\ CURRENT\ ROTATING}$ represents the most current key in the appropriate rotating key store. For example, when browser 202 is at a "Private Client Computer System" (e.g., as indicated by a communication property selection), $K_{MOST\ CURRENT\ ROTATING}$ represents the most current key in private rotating key store 231 (e.g., key 232). GUID represents a unique identifier corresponding to the client computer system 201. HMACKeyString represents a constant string of text. From $K_{SIG}$ a Hashed Message Authentication Code can be generated according to Formula 2:

Digital Signature=HMAC($K_{SIG}$, (GUID, {username: password}, Flags))

FORMULA 2

In Formula 2, HMAC represents a Hashed Message Authentication Code algorithm, such as, for example, as described in Request For Comments ("RFC") 2104. The (GUID, {username:password}, Flags) portion of Formula 2 represents that the GUID, user credentials, and flags representing communication property selections are included as text input to the Hashed Message Authentication Code algorithm. When appropriate, the user credentials can be converted to text format (e.g., by base64 encoding the user credentials) for compatibility with a Hashed Message Authentication Code algorithm. Although described in terms of a Hashed Message Authentication Code algorithm, the algorithm used to generate a digital signature is not import and virtually any digital signature, digest, or authentication code algorithm can be used.

Login element validator 216 can also derive an encryption key, which can be used to encrypt data, by hashing a combination of a most current key in a rotating key store, the unique identifier, and a second constant string. Accordingly, an encryption key can be derived according to Formula 3:

$K_{ENC}$=SHA-1($K_{MOST\ CURRENT\ ROTATING}$, GUID, EncryptKeyString)

FORMULA 3

In Formula 3, $K_{MOST\ CURRENT\ ROTATING}$ represents the most current key from a rotating key store that was used in the generation of the signature key. Thus, if key 232 was used to generate $K_{SIG}$, key 232 can also be used to generate $K_{ENC}$. GUID represents the unique identifier corresponding to client computer system 201. EncryptKeyString represents a constant string of text that differs from HMACKeyString. Accordingly, encrypted information can be generated according to Equation 4:

Encrypted Information=$K_{ENC}$[Digital Signature, {username:password}, Flags]

FORMULA 4

In Formula 4, Digital Signature represents the Digital Signature generated by Formula 2, {username: password} represents user credentials, and Flags represents communication property selections.

Step 311 includes a corresponding act of sending encrypted information that represents at least a portion of the user credentials and a time-dependent signature (act 309). Act 309 can include the server computer system sending encrypted information that represents at least a portion of the user credentials and a time-dependent signature to the client computer system. For example, login element validator 216 can send message 255, which includes, GUID 274 and encrypted credentials 275, to client computer system 201. As indicated by the dashed line through communication filter 243, communication filter 243 can be configured to allow message 255 to pass without altering message 255. Accordingly, message 255 can be forwarded to client computer system 201 without modification.

Method 300 includes an act of receiving encrypted information that represents at least a portion of the user credentials and a time-dependent signature (act 304). Act 304 can include the client computer system receiving encrypted information that represents at least a portion of the user credentials and a time-dependent signature from the server computer system. For example, client computer system 201 can receive message 255, which includes GUID 274 and encrypted credentials 275, from server computer system 211. Message 255 can be configured to cause client computer system 201 to store GUID 274 and encrypted credentials 275 in cookies 203. For example, message 255 be configured as follows:

Set-Cookie:sessionid={GUID};path=/

Set-Cookie:creddata={Encrypted Information};path=/

Method 300 includes an act of sending a second request that includes the encrypted information (act 305). Act 305 can include the client computer system sending a second request for Web-based access to the resource (e.g., the electronic mail message requested in the first request). For example, client computer system 201 can send request 256, which includes mail server URI 267, GUID 274, and encrypted credentials 275, to server computer system 211. Method 300 includes an act of receiving a second request that includes the encrypted information (act 310). Act 310 can include the server computer system receiving a second request for Web-based access to the resource (e.g., the electronic mail message requested in the first request). For example, server computer system 211 can receive request 256, which includes mail server URI 267, GUID 274, and encrypted credentials 275, from client computer system 201.

Figure 2B:
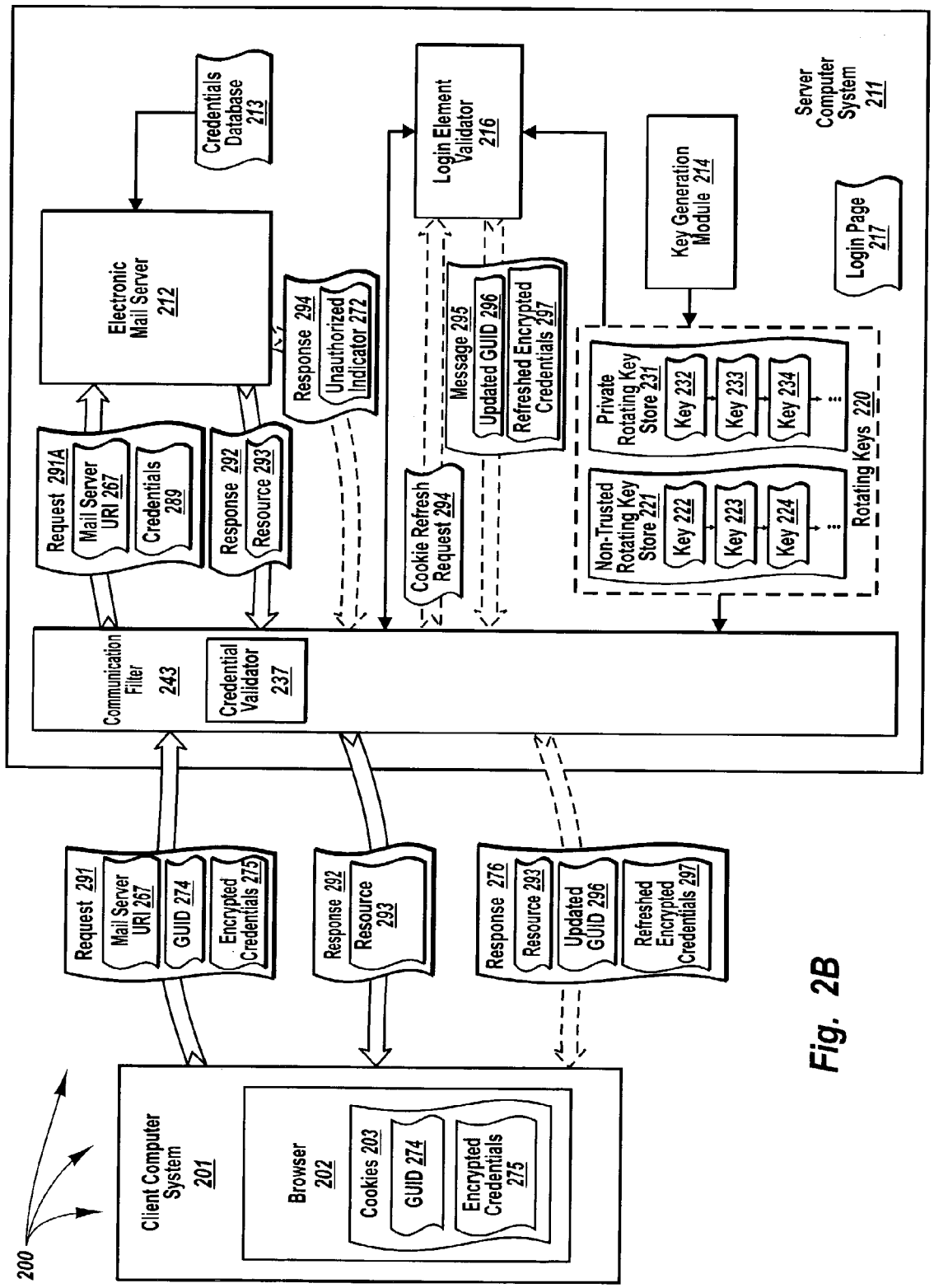
FIG. 2B illustrates an example of a network architecture that facilitates utilizing secured client-side credentials to access a resource at a server in accordance with the present invention.
Figure 4:
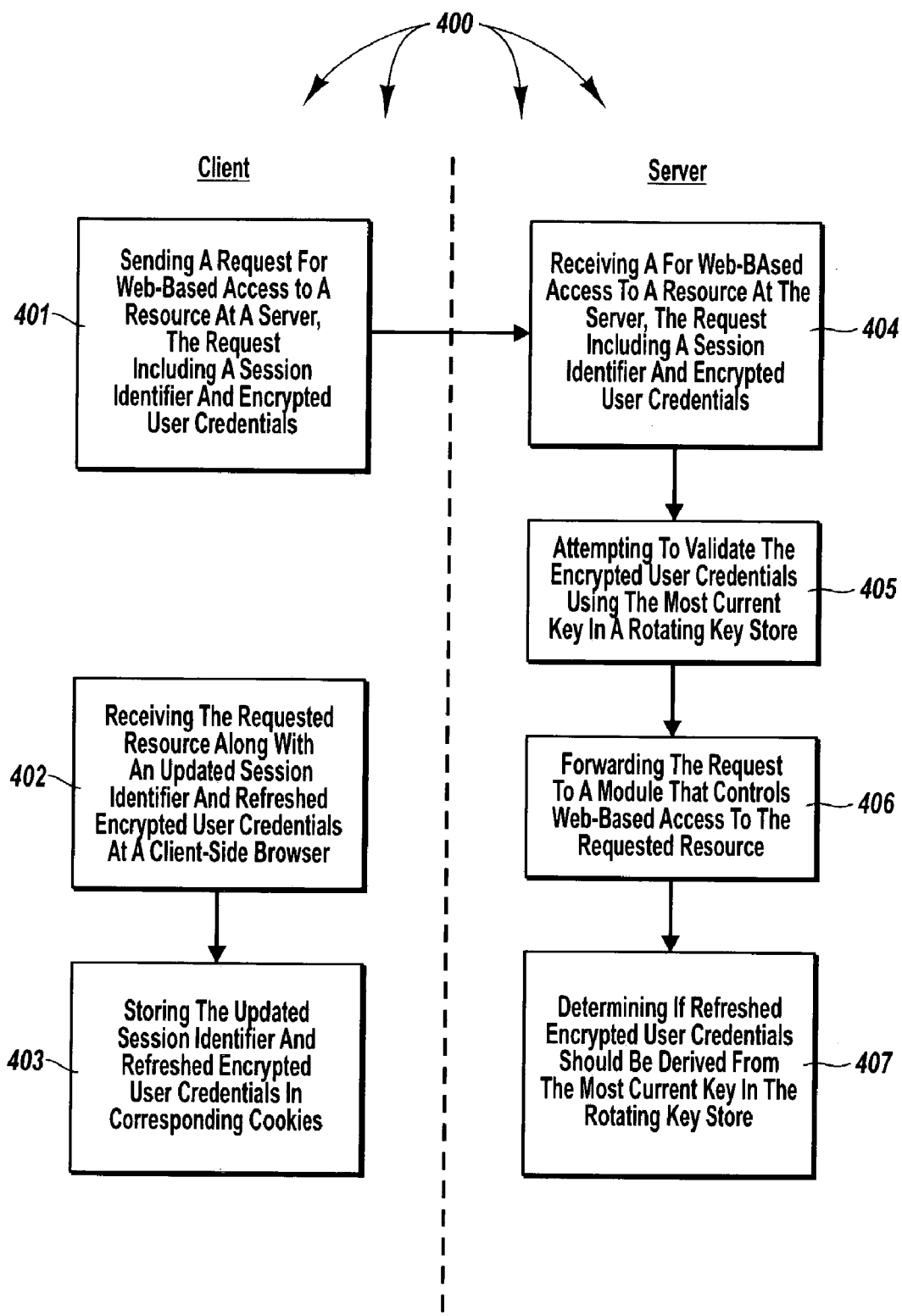
FIG. 4 illustrates an example flowchart of a method for utilizing secured client-side credentials to access a resource at a server in accordance with the present invention.

In some embodiments, a client computer system already stores corresponding cookies with a GUID and encrypted information in browser memory. The stored GUID and encrypted information can be used when requesting Web-based access to a resource (e.g., an electronic mail data) at a server. FIG. 2B illustrates an example of network architecture 200 that facilitates utilizing secured client-side credentials to access a resource at a server in accordance with the present invention. FIG. 4 illustrates an example flowchart of a method 400 for utilizing secured client-side credentials to access a resource at a server in accordance with the present invention. The method 400 will be described with respect to the client computer system and server computer system depicted in FIG. 2B.

Method 400 includes an act of sending a request, which includes a session identifier and encrypted user credentials, for Web-based access to a resource at a server (act 401). Act 401 can include a client computer system sending a request for Web-based access to a resource at server computer system. For example, client computer system 201 can send request 291, which includes mail server URI 267, GUID 274, and encrypted credentials 275, to server computer system 211. Mail server URI 267 represents a URI that provides access to electronic mail resources controlled by electronic mail server 212. GUID 274 represents a unique session identifier that was previously sent from server computer system 211 to client computer system 201. Encrypted credentials 275 represent encrypted user credentials and a time-dependent signature that were previously sent from server computer system 211 to client computer system 201.

Encrypted credentials 275 may have been generated from a key in an appropriate rotating key store.

Method 400 includes an act of receiving a request, which includes a session identifier and encrypted user credentials, for Web-based access to resource at the server (act 404). Act 404 can include the server computer system receiving a request for Web-based access to a resource at the server computer system. For example, server computer system 211 can receive request 291, which includes mail server URI 267, GUID 274, and encrypted credentials 275, from client computer system 201.

Method 400 includes an act of attempting to validate the encrypted user credentials using the most current key in a rotating key store (act 405). Act 405 can include the server computer system attempting to validate at least a portion of the user credentials using the most current key in a rotating key store. For example, when it is indicated that browser 202 is at a private client computer system, server computer system can attempt to validate encrypted credentials 275 using key 232. On the other hand, when it is indicated that browser 202 is at a non-trusted client computer system, server computer system can attempt to validate encrypted credentials 275 using key 222. Credential validator 237 can derive a decryption key, which can be used to decrypt data, by hashing a combination of the most current key from an appropriate rotating key store, the unique session identifier, and the second constant string (used when deriving the encryption key). Accordingly, an decryption key can be derived according to Formula 5:

$$K_{DCR} = \text{SHA-1}(K_{MOST\ CURRENT\ ROTATING}, \text{GUID}, \text{EncryptKeyString})$$

FORMULA 5

In Formula 5, $K_{MOST\ CURRENT\ ROTATING}$ represents the most current key in an appropriate rotating key store (e.g., key 232 or key 222). GUID represents the unique identifier corresponding to client computer system 201. EncryptKeyString represents the constant string used during derivation of $K_{ENC}$. Accordingly, credential validator 237 can decrypt encrypted information to reveal a Digital Signature, User Credentials, and Flags representing communication property selections according to Formula 6:

$$\text{Digital Signature, \{username:password\}, Flags} = K_{DCR}[\text{Encrypted Information}]$$

FORMULA 6

Credential validator 237 can derive a validation key, which can be used to generate a validation digital signature, by hashing a combination of the most current key in an appropriate rotating key store, the unique identifier, and a first constant string. In some embodiments, a validation digital signature is represented as a Hashed Message Authentication Code. Accordingly, a validation key can be derived according to Formula 7:

$$K_{VAL} = \text{SHA-1}(K_{MOST\ CURRENT\ ROTATING}, \text{GUID}, \text{HMACKeyString})$$

FORMULA 7

In Formula 7, $K_{MOST\ CURRENT\ ROTATING}$ represents the most current key in an appropriate rotating key store. GUID represents the unique identifier corresponding to client computer system 201. HMACKeyString represents the constant string of text used when deriving the signature key. From $K_{VAL}$ and using revealed user credentials and Flags form Formula 6, a Hashed Message Authentication Code can be generated according to Formula 8:

$$\text{Validation Digital Signature} = \text{HMAC}(K_{VAL}, (\text{GUID}, \{\text{username:password}\}, \text{Flags}))$$

FORMULA 8

In Formula 8, HMAC represents a Hashed Message Authentication Code algorithm. The (GUID, {username:password}, Flags) portion of Formula 8 represent that the GUID, user credentials, and flags representing communication property selections are included as text input to the Hashed Message Authentication Code algorithm. Although described in terms of a Hashed Message Authentication Code algorithm, the algorithm used to generate a validation digital signature is not import and virtually any digital signature, digest, or authentication code algorithm can be used.

When the validation digital signature equals the digital signature, the user credentials represented in encrypted credentials 275 are validated. Accordingly, communication filter 243 builds an authorization header (e.g., an HTTP authorization header) that includes the validated user credentials. Communication filter 243 can insert the authorization header into the request for Web-based access to a resource. For example, communication filter 243 can remove encrypted credentials 275 from request 291 and insert credentials 289 into request 291, resulting in request 291A.

When the validation digital signature does not equal the digital signature, user credentials are not validated. Accordingly, credential validator 237 repeats the functionality of Formulas 5, 6, 7, and 8 based on the next most current key in the appropriate rotating key store. For example, for a client-side browser at a private client computer system, credential validator 237 can use key 233. On the other hand, for a client-side browser at a non-trusted client, credential validator 237 can use key 223. Credential validator can attempt to validate user credentials using each key in an appropriate rotating key store. Validated user credentials can be included in an appropriate authorization header.

In some embodiments, an index included along with encrypted credentials to indicate the rotating key that is to be used to attempt to validate the encrypted credentials (e.g., the rotating previously used to encrypt the credentials). For example, client computer system 201 can include an index, which identifies a rotating key in non-trusted rotating key store 221 or in private rotating key store 231, in request 291. An index can be a numeric. value (e.g., 0, 1, 2, etc.) that identifies the generation of a rotating key that is to be used. For example, when client computer system 201 is a private client computer system, an index of 0 can identify key 232. Similarly, when client computer system 201 is a non-trusted client. computer system, an index of 2 can identify key 224. Accordingly, the use of an index can increase the efficiency of the validation process. When credentials are not validated with a rotating key identified in a index, other keys in a corresponding rotating key store can then be used to attempt to validate the credentials.

The method 400 includes an act of forwarding the request to a module that controls Web-based access to the requested resource (act 406). Act 406 can include the server computer system forwarding the request to a module that controls Web-based access to the resource. For example, communication filter 243 can forward request 291A, which includes mail server URI 267 and credentials 289 (as revealed from encrypted credentials 275), to electronic mail server 212. Electronic mail server 212 may be a module that contrails Web-based access to electronic mail resources. Electronic mail server 212 can compare credentials 289 to credentials database 213 to determine if Web-based access to a requested electronic mail resource is authorized.

The method 400 includes an act of determining if refreshed encrypted user credentials should be derived from the most current key in the rotating key store (act 407). Act 407 can include the server computer system determining if refreshed encrypted information representing the user credentials and a time-dependent signature should be derived from the most current key in the rotating key store. When user credentials are validated with a key from a rotating key store other than the most current key from the rotating key store, the server determines that refreshed encrypted information is to be derived. For example, if credential validator 237 validates encrypted credentials with key 224, communication filter 243 can determine that refreshed encrypted credentials are to be derived for the user credentials represented in the encrypted credentials.

Accordingly, as represented by the dashed arrow, communication filter 243 can optionally send cookie refresh request 294 to login element validator 216. Login element validator 216 can use the most current rotating key in an appropriate rotating key store to derive the refreshed encrypted information (e.g., by deriving a refreshed digital signature and refreshed encryption key from the most current key). Login element validator 216 can return an updated GUID and refreshed encrypted credentials to communication filter 243. For example, as represented by the dashed arrow, login element validator 216 returns message 295, which includes updated GUID 296 and refreshed encrypted credentials 297, to communication filter 243.

When credentials 289 are appropriate for Web-based access to electronic mail resources at electronic mail server 212, electronic mail server 212 can return an electronic mail resource in response to request 291A. For example, electronic mail server 212 can return response 292, which includes resource 293 (e.g., an electronic mail message), to communication filter 243. On the other hand, when credentials 289 are not appropriate for Web-based access to electronic mail resources at electronic mail server 212, electronic mail server 212 can return an unauthorized indication in response to request 291A. For example as represented by the dashed arrow, electronic mail server 212 can return response 294, which includes unauthorized indicator 272, to communication filter 243. When communication filter 243 receives an unauthorized indicator, communication filter 243 can re-direct client computer system 201 to login page 217.

When validated user credentials are appropriate, communication filter 243 can send a requested resource to client computer system 201. For example, when encrypted credentials 275 are validated with the most current key from an appropriate rotating key store, response 292, which includes resource 293, is received at communication filter 243. Communication filter 243 can forward response 292 on to client computer system 201. Accordingly, resource 293 can be presented at browser 202.

When validated user credentials are appropriate, communication filter 243 can also send refreshed encrypted credentials and an updated GUID along with a resource to client computer system 201. For example, when encrypted credentials 275 are validated with a key from a rotating key store that is not the most current key in the rotating key store, resource 293, updated GUID 296, and refreshed encrypted credentials 297 can all be received at communication filter 243. As represented by the dashed arrow, communication module 243 can then send response 276, which includes resource 293, updated GUID 296, and refreshed encrypted credentials 297, to client computer system 201.

The method 400 includes an act of receiving the resource along with an updated session identifier and refreshed encrypted user credentials at a client-side browser (act 402). Act 402 can include the client computer system receiving the requested along with an updated session identifier and refreshed encrypted information representing at least the portion of the user credentials and a refreshed time-dependent signature. For example, client computer system 201 can receive response 276, which includes resource 293, updated GUID 296, and refreshed encrypted credentials 297, from server computer system 201.

The method 400 includes an act of storing the updated session identifier and refreshed encrypted user credentials in corresponding cookies (act 403). Act 403 can include the client computer system storing the updated session identifier and the refreshed encrypted information in corresponding cookies at the client computer system. For example, updated GUID 296 and refreshed encrypted credentials 297 can be stored in corresponding cookies in cookies 203, overwriting GUID 274 and encrypted credentials 275. Resource 293 can be presented at browser 202.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a server computer system, a method for determining the validity of user credentials used for Web-based access to resources at the server computer system, the method comprising:

an act of the server computer system receiving a request from a client computer system for Web-based access to a resource at the server, the request including:
 a unique session identifier which is unique to a particular session between the server computer system and the client computer system; and
 encrypted information representing at least a portion of user credentials and a time-dependent signature, the time-dependent signature being derived from the at least a portion of the user credentials and a signature time-dependent key, the encrypted information received from the client computer being encrypted using at least one key obtained from a rotating key store of the server computer system and by using an encryption time-dependent key, the signature time-dependent key being derived from the key in the rotating key store at the server, and the encryption time-dependent key being derived from the key in the rotating key store at the server and the unique session identifier, wherein a key generation module at the server generates keys for the rotating key store and which are passed to the client computer system;

an act of the server computer system attempting to validate at least a portion of the user credentials using the most current key in a rotating key store and determining that the at least a portion of the user credentials cannot be validated using the most current key in the rotating key store;

an act of the server computer attempting to validate the at least a portion of the user credentials using other keys in the rotating key store;

an act of the server computer validating the user credentials using a key in the key store other than the most current key of the rotating key store;

an act of the server computer system forwarding the request to a module that controls Web-based access to the requested resource; and in response to the server computer validating the user credentials with a key other than the most current key of the rotating key store, an act of the server computer system determining that refreshed encrypted information representing the at least a portion of the user credentials and a time-dependent signature are to be derived from the most current key in the rotating key store.

2. The method as recited in claim 1, wherein the server computer validating the user credentials using a key in the key store other than the most current key of the rotating key store further comprises:

an act of the server computer system determining that based on a previously generated key in the rotating key store the at least a portion of the user credentials are valid, the previously generated key being inserted into the rotating key store before the most current key.

3. The method as recited in claim 1, further comprising:

an act of the server computer system re-directing the client computer system to a login page that provides an interface for receiving user credentials.

4. A method as recited claim 1, wherein the rotating key store maintains a plurality of keys therein, and such that when a new key is generated by the key generation module, the newly generated key is rotated into the rotating key store and an older key is rotated out of the rotating key store.

5. The method as recited in claim 1, wherein the act of the server computer system determining that refreshed encrypted information representing the at least a portion of the user credentials and a time-dependent signature should be derived from the most current key in the rotating key store comprises an act of determining that refreshed encrypted information representing the at least a portion of the user credentials and a time-dependent signature should be derived from the most current key in the rotating key store.

6. The method as recited in claim 5, wherein the act of determining that refreshed encrypted information representing the at least a portion of the user credentials and a time-dependent signature should be derived from the most current key in the rotating key store comprises an act of determining that the server computer system validated the at least a portion of the user credentials based on a previously generated key in the rotating key store, the previously generated key being inserted into the rotating key store before the most current key.

7. The method as recited in claim 1, wherein the act of the server computer system determining that refreshed encrypted information representing the at least a portion of the user credentials and a time-dependent signature are to be derived from the most current key in the rotating key store comprises an act of deriving refreshed encrypted information and a time-dependent signature from the most current key in the rotating key store.

8. The method as recited in claim 7, further comprising:

an act of the server computer system sending the requested resource, an updated unique session identifier, and refreshed encrypted information to the client computer system.

9. A computer program product for use in a server computer system, the computer program product for implementing a method as recited in claim 1.

10. The computer program product as recited in claim 9, wherein the one or more computer-readable media are physical media.

* * * * *